3,706,750
PYRRYLAMINOKETONE DERIVATIVES
Uberto Teotino and Davide Della Bella, Milan, Italy, assignors to Whitefin Holding SA, Lugano, Switzerland
No Drawing. Continuation-in-part of application Ser. No. 636,643, May 8, 1967. This application Oct. 5, 1970, Ser. No. 78,262
Claims priority, application Great Britain, May 17, 1966, 21,777/66
Int. Cl. C07d 99/02, 99/04
U.S. Cl. 260—293.71                 6 Claims

ABSTRACT OF THE DISCLOSURE

This invention relates to pyrrylaminoketone derivatives of the formula:

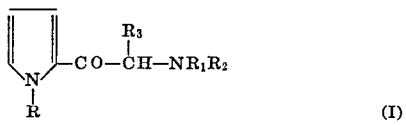

wherein R is a member selected from the group consisting of methyl, ethyl, phenyl or benzyl whose benzene moiety may be further substituted with one or two substitutents selected from the group consisting of halogen, methyl, and methoxy; $R_3$ is hydrogen or methyl; $R_1$ is selected from the group consisting of hydrogen and alkyl having from 1 to 4 C atoms; $R_2$ is selected from the group consisting of hydrogen, alkyl having from 1 to 4 C atoms and benzyl or taken together with $R_1$ and the nitrogen atom to which they are attached, is a heterocyclic ring selected from the group consisting of piperidine, morpholine and its pharmaceutically suitable addition salts with organic and inorganic acids and alkyl halides, which compounds are highly valuable for their activity on the central nervous system.

---

This application is a continuation-in-part of Ser. No. 636,643, filed on May 8, 1967, now abandoned.

This invention relates to pyrrylaminoketone derivatives.

The pyrrole derivatives according to this invention have the formula:

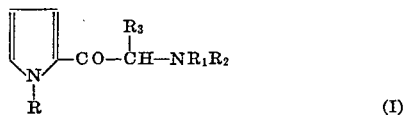

wherein R is a member selected from the group consisting of methyl, ethyl, phenyl or benzyl whose benzene moiety may be further substituted with one or two substitutents selected from the group consisting of halogen, methyl, and methoxy; $R_3$ is hydrogen or methyl; $R_1$ is selected from the group consisting of hydrogen and alkyl having from 1 to 4 C atoms; $R_2$ is selected from the group consisting of hydrogen, alkyl having from 1 to 4 C atoms and benzyl or taken together with $R_1$ and the nitrogen atom to which they are attached, is a heterocyclic ring ring selected from the group consisting of piperidine, morpholine and pyrrolidine and its pharmaceutically suitable addition salts with organic and inorganic acids and alkyl halides.

The new compounds of the invention are highly valuable for their activity on the central nervous system.

They are prepared by reacting a haloketone of the formula:

wherein R and $R_3$ have the meanings given above and X is a halogen atom with an amine of the formula $NHR_1R_2$ (III) wherein $R_1$ and $R_2$ have the meanings given above, hydrogenating, if desired, the compound where $R_2$ is a benzyl radical and reacting, in case, the compound thus obtained with an acid or an alkyl halide to prepare the corresponding salt.

The intermediate haloketones of Formula II have been prepared, by the hydrolysis of the corresponding ketimine hydrochloride in the presence of water and an organic solvent at the boiling temperature of the reaction mixture until al lthe solid product has been dissolved. The organic solvent is inert under the reaction conditions and may be for example di-isopropyl ether, benzene, chloroform, carbon tetrachloride, diethyl ether, dichloromethano, or ethyl acetate. The presence of the inert organic solvent permits the dissolution of the just formed haloketone and its preservation from prolonged contact with the acid-water layer which would cause the formation of tar-like substances. Besides, the presence of the organic solvent allows the crystallization of the haloketones by cooling and concentration of the organic layer in a form pure enough to be condensed with the amines of the Formula III without further purification. The yield of the hydrolysis is generally from 80 to 95 percent. The corresponding ketimine hydrochlorides may be prepared according to a modified Houben-Hoesch synthesis such as the one given by F. F. Blicko et al., J. Amer. Chem. Soc. 1943, 65, 2466 for the preparation of the 2-chloroketiminepyrrole hydrochloride.

The haloketones may also be prepared by reacting a N-substituted pyrrylmagnesium halide with a haloalkylnitrile or with a haloalkylcarbonylhalide.

The reaction between the halo ketones of the Formula II and the amines of the Formula II is preferably carried out in a sealed tube at from room temperature to 150° C. for from two to fifty hours in the presence of an acid binding agent, the acid binding agent being, for instance, an excess of the amino itself, pyridine, a trialkylamine, an N,N-dialkylaniline, or an alkali metal or alkaline earth metal carbonate or dicarbonate. Advantageously the reaction is carried out in the presence of an inert solvent such as ethyl alcohol, benzene or a mixture thereof. This method allows to prepare both the mono- and the di-substituted pyrrylaminoketones of this invention.

Furthermore the pyrrylaminoketones of the Formula I wherein $R_2$ is hydrogen can be advantageously prepared by catalytic hydrogenation at atmospheric pressure of the compound of Formula I wherein $R_2$ is a benzyl radical. This reduction can be performed with hydrogen in the presence of a catalyst such as 5% palladium on carbon and of an inert solvent at atmospheric pressure at from 15° to 60° C. until the theoretical amount of hydrogen is taken up. This process is particularly useful when there are not present in the molecules other groups which may be affected by hydrogenation or when, such groups being present, the benzyl group is to be simultaneously split off and the other groups reduced or split off too. Among the groups which are affected by hydrogenation may be mentioned the halogen group on the R radical. On the other hand the benzyl group linked to the nitrogen atom of the pyrrole ring is not affected.

The acid addition salts of this invention can be prepared by reacting the pyrrolo derivatives of the Formula I with either the chemically equivalent amount of organic or inorganic acid in a water-miscible solvent, such as acetone or ethanol, with isolation of the salt by concentration and cooling, or by reaction with an excess of the acid in a water-immiscible solvent, such as diethyl ether or chloroform, with the salt separating directly. Exemplary of such organic salts are those maleic, fumaric, benzoic, ascorbic, succinic, methanesulphonic and benzenesulphonic acids. Exemplary of such inorganic salts are those with hydrochloric, hydrobromic and sulphuric acids. The quaternary ammonium salts of this invention can also be prepared by reacting a pyrrole derivative of the general Formula I with an alkyl lower halide, such as methyl bromide or methyl iodide.

The pyrrylaminoketones of this invention possess unexpected, significant pharmacological properties in that they are active on the central nervous system. More precisely the 1 - benzyl - 2 - pyrrolidinoacetyl-pyrrole, the 1 - benzyl - 2 - piperidinoacetyl - pyrrole and their salts of addition have shown a very good activity as analeptics and convulsants. Particularly good results have been obtained with the 1-benzyl-2-pyrrolidinoacetyl-pyrrole methyl bromide.

All the remaining compounds prepared in the hereinafter reported examples have proved, at the pharmacological screenings, particularly valuable as analgesics and sedatives. Particularly interesting results have been obtained with 1 - (4' - chloro) - benzyl - 2 - pyrrolidinoacetyl-pyrrole which exhibits a significant analgesic, antiexudative and anti-inflammatory activity.

The $ED_{50}$ values measured in the mice according to the stretching test are 10 mg./kg. per os and 30 mg./kg. parenterally. The activity on plantar oedema by ovalbumin and granuloma by foreign body in the rat has been evidenced at the dosis of 50–100 mg./kg. per os.

The chronic toxicity tests have been carried out in the rat by administration of 100 mg./kg. per os pro die. The compounds were well tolerated and the examination of the tissues following slaughter did not reveal evidence of pathological changes and the hematologic values were unaffected.

These derivatives can be administered orally, subcutaneously or intravenously in any of the pharmaceutical forms generally employed for these administration routes.

A composition which may be prepared according to this invention without, however, limiting the same, is the following:

| | Mg |
|---|---|
| 1-(4' - chloro)-benzyl - 2 - pyrrolidinoacetyl-pyrrole hydrochloride | 150.00 |
| Disodium edetate | 3.00 |
| Sodium bisulfite | 0.75 |
| Distilled water q.s ad 3 ml. | |

The vials are then sterilized at 120° C. for 20 minutes.

The following examples illustrate the invention.

EXAMPLE I 139 g. (0.885 mol) of 1-benzyl-pyrrole, 90 g. (19 mol) of chloroacetonitrile and 450 ml. of diethyl ether are placed in a dry-2-litre three-necked round bottomed flask equipped with a sealed stirrer, a reflux condenser, an inlet tube and a thermometer, the condenser being provided with calcium chloride drying tube. The contents of the flask are stirred and cooled by an ice bath while a stream of hydrogen chloride, which has been dried by passage through sulphuric acid, is bubbled through the suspension until the suspension is saturated and hydrogen chloride starts to be evolved. The current of gas is discontinued and the suspension is allowed to stand at room temperature for 16 hours. The precipitate is collected by filtration, washed with diethyl ether and dried in vacuo. The dry product is suspended into 1260 ml. of distilled water and 3–200 ml. of di-isopropyl ether. Stirring is started and the suspension is warmed on a water bath until the solid product has been dissolved. The warm organic layer is separated from the water layer and allowed to stand overnight in a refrigerator. The precipitate is collected by filtration and dried in vacuo. Yield 215 g. of 1-benzyl-2-chloroacetylpyrrole which melts at 91–93° C.

In an analogous manner, oily products being recovered by evaporation of the solvent and purified by distillation, the following compounds have been prepared:

1-phenyl-2-chloroacetylpyrrole—M.P.=45–47° C. (from diethyl ether)
1-benzyl-2-chloro-propionylpyrrole—B.P.=145–148° C. (0.1–0.2 mm./Hg)
1-(2'-chloro)-benzyl-2-chloroacetylpyrrole—M.P.=72–73° C.
1-(4'-chloro)-benzyl-2-chloroacetylpyrrole—M.P.=95–96° C.
1-methyl-2-chloroacetylpyrrole—M.P.=47–48° C. (from petroleum ether)
1-ethyl-2-chloroacetylpyrrole—B.P.=72–73° C./0.3 mm. Hg
1-(4'-bromo)-benzyl-2-chloroacetylpyrrole—M.P.=95–97° C.
1-(4'-methoxy)benzyl-2-chloroacetylpyrrole—M.P.=93–94° C.
1-(2',6'-dimethyl)-phenyl-2-chloroacetylpyrrole—B.P.=100–110° C. (0.5 mm. Hg)

The following compounds not yet disclosed:

1-(2'-chloro)-benzyl-pyrrole—B.P.=110–112° C./2 mm. Hg
1-(4'-chloro)-benzyl-pyrrole—B.P.=120–125° C./1 mm. Hg
1-(4'-bromo)-benzyl-pyrrole—B.P.=130–135° C./1 mm. Hg
1-(4'-methoxy)-benzyl-pyrrole—B.P.=108–110° C./0.4 mm. Hg have been prepared according to the process disclosed by C. F. Hobbs, J.A.C.S. 84, 43 (1962), for the preparation of 1-benzyl-pyrrole.

Whereas 1-(2',6' - methyl)-phenyl-pyrrole (B.P.=64–67° C./0.5 mm. Hg) has been prepared according to the process disclosed by Allan, C. F. H., et al., J.O.C 2, 230 (1937), for the preparation of 1-phenyl-pyrrole.

EXAMPLE II

To a mixture of 17 g. (0.064 mol) of 1-benzyl-2-chloroacetylpyrrole in 40 ml. of absolute ethanol, cooled in a tube to the temperature of an ice salt bath is added 6.175 g. (10 ml.: 0.15 mol) of a cooled dimethylamine. The tube is sealed, warmed to 50–60° C. until dissolution is complete and allowed to stand two days. After this period the mixture is concentrated by evaporation under reduced pressure.

The residue is dissolved with 10% hydrochloric acid, the solution is decolourized with carbon black, made alkaline with a saturated aqueous solution of potassium carbonate and shaken with chloroform. The chloroform extracts are decolourized with carbon black and dried over anhydrous sodium sulphate. After the chloroform has been removed under reduced pressure, the residue is distilled under reduced pressure in a rotary evaporator. The yield of yellowish 1-benzyl-2-dimethylaminoacetyl-pyrrole boiling at 120–125° C./0.4 mm. Hg is 13.6 g.

By analogous procedures the following compounds have been prepared:

1-benzyl-2-diethylaminoacetyl-pyrrole—B.P.=125–130° C./0.4 mm. Hg
1-benzyl-2-dipropylaminoacetyl-pyrrole—B.P.=130–135° C./0.4 mm. Hg
1-benzyl-2-diisopropylaminoacetyl-pyrrole—B.P.=130–135° C./0.5 mm. Hg
1-benzyl-2-dibutylaminoacetyl-pyrrole—B.P.=150–155° C./0.5 mm. Hg
1-benzyl-2-diisobutylaminoacetyl-pyrrole—B.P.=142–145° C./0.4 mm. Hg
1-benzyl-2-disec.-butylaminoacetyl-pyrrole—B.P.=140–143° C./0.7 mm. Hg
1-benzyl-2-morpholinoacetyl-pyrrole—B.P.=155–160° C./0.4 mm. Hg
1-benzyl-2-morpholinoacetyl-pyrrole hydrochloride—M.P.=176–179° C. (dec.)
1-benzyl-2-morpholinoacetyl-pyrrole oxalate—M.P.=159–161° C.
1-benzyl-piperidinoacetyl-pyrrole—B.P.=130–135° C./0.4 mm. Hg
1-benzyl-2-piperidinoacetyl-pyrrole hydrochloride—M.P.=158–161° C.
1-benzyl-2-piperidinoacetyl-pyrrole oxalate—M.P.=135–137° C.
1-benzyl-2-pyrrolidinoacetyl-pyrrole—M.P.=115–117° C. (dec.)
1-benzyl-2-pyrrolidinoacetyl-pyrrole hydrochloride—M.P.=158–160° C.
1-benzyl-2-(N-methyl-N-benzyl-aminoacetyl)—M.P.=209–212° C. (dec.)
1-benzyl-2-(N-ethyl-N-benzyl-aminoacetyl)-pyrrole—B.P.=175–180° C./0.3–0.4 mm. Hg
1-benzyl-2-(N-propyl-N-benzyl-aminoacetyl)-pyrrole—B.P.=170–180° C./0.2 mm. Hg
1-benzyl-2-(N-isopropyl-N-benzyl-aminoacetyl)-pyrrole—M.P.=224–231° C.
1-benzyl-2-(N-butyl-N-benzyl-aminoacetyl)-pyrrole—B.P.=180–190° C./0.5 mm. Hg
1-benzyl-2-(N-isobutyl-N-benzyl-amino-acetyl)-pyrrole—B.P.=170–180° C./0.3–0.4 mm. Hg
1-benzyl-2-(N-terbutyl-N-benzyl-aminoacetyl)-pyrrole—M.P.=234–237° C. (dec.)
1-benzyl-2-(N-sec.butyl-N-benzyl-amino-acetyl)-pyrrole—B.P.=180–185° C./0.4–0.5 mm. Hg
1-methyl-2-pyrrolidinoacetyl-pyrrole—B.P.=75–80° C./0.2 mm. Hg
1-methyl-2-pyrrolidinoacetyl-pyrrole hydrochloride—M.P.=230–232° C. (dec.)
1-methyl-2-piperidinoacetyl-pyrrole—B.P.=90–95° C./0.2 mm. Hg
1-methyl-2-piperidinoacetyl-pyrrole hydrochloride—M.P.=232–233° C. (dec.)
1-methyl-2-diethylaminoacetyl-pyrrole—B.P.=80–82° C./0.2 mm. Hg
1-methyl-2-diethylaminoacetyl-pyrrole hydrochloride—M.P.=182–184° C. (dec.)
1-methyl-2-disec.-butylaminoacetyl-pyrrole—B.P.=90–95° C./0.3 mm. Hg
1-methyl-2-disec.-butylaminoacetyl-pyrrole hydrochloride—M.P.=184–187° C.
1-phenyl-2-diethylaminoacetyl-pyrrole hydrochloride—M.P.=203–206° C.
1-phenyl-2-disec.-butylaminoacetyl-pyrrole—B.P.=160–170° C./0.2 mm. Hg
1-phenyl-2-pyrrolidinoacetyl-pyrrole—B.P.=155–160° C./0.3–0.4 mm. Hg
1-phenyl-2-piperidinoacetyl-pyrrole hydrochloride—M.P.=200–201° C. (dec.)
1-(2'-chloro)-benzyl-2-diethylaminoacetyl-pyrrole—B.P.=120–125° C./0.2 mm. Hg
1-(2'-chloro)-benzyl-2-disec.-butylamino-acetyl-pyrrole—B.P.=156–158° C./0.4 mm. Hg
1-(2'-chloro)-benzyl-2-piperidinoacetyl-pyrrole—B.P.=160–165° C./0.2 mm. Hg
1-(2'-chloro)-benzyl-2-piperidinoacetyl-pyrrole hydrochloride—M.P.=206–207° C. (dec.)
1-(2'-chloro)-benzyl-2-pyrrolidinoacetyl-pyrrole—B.P.=150–160° C./0.2 mm. Hg
1-(2'-chloro)-benzyl-2-pyrrolidinoacetyl-pyrrole hydrochloride—M.P.=178–180° C. (dec.)
1-(4'-chloro)-benzyl-2-diethylaminoacetyl-pyrrole—B.P.=160–165° C./0.15 mm. Hg
1-(4'-chloro)-benzyl-2-pyrrolidinoamino-acetyl pyrrole—B.P.=160–165° C./0.1 mm. Hg
1-(4'-chloro)-benzyl-2-pyrrolidinoamino-acetyl-pyrrole hydrochloride—M.P.=189–191° C. (dec.)
1-(4'-chloro)-benzyl-2-piperidinoacetyl-pyrrole hydrochloride—M.P.=215–217° C. (dec.)
1-benzyl-2-(a-diethylamino)-propionyl-pyrrole—B.P.=140–145° C./0.3 mm. Hg
1-benzyl-2-(a-disec.-butylamino)-propionyl-pyrrole—B.P.=140–150° C./0.2 mm. Hg
1-benzyl-2-(a-disec.-butylamino)-propionyl-pyrrole oxalate—M.P.=138–140° C. (dec.)
1-benzyl-2-(a-piperidino)-propionyl-pyrrole—B.P.=145–150° C./0.2–0.4 mm. Hg
1-benzyl-2-(a-pyrrolidino)-propionyl-pyrrole—B.P.=125–130° C./0.1–0.2 mm. Hg
1-(4'-methoxy)-benzyl-2-pyrrolidinoacetyl-pyrrole—B.P.=150–160° C./0.4 mm. Hg
1-(4'-methoxy)-benzyl-2-pyrrolidinoacetyl-pyrrole hydrochloride—M.P.=191–192° C.
1-(4'-methoxy)-benzyl-2-diethylaminoacetyl-pyrrole—B.P.=165–170° C./0.4 mm. Hg
1-(4'-methoxy)-benzyl-2-diethylaminoacetyl-pyrrole picrate—M.P.=128–129° C.
1-ethyl-2-pyrrolidinoacetyl-pyrrole—B.P.=100–105° C./0.5 mm. Hg
1-ethyl-2-pyrrolidinoacetyl-pyrrole oxalate—M.P.=131–132° C. (dec.)
1-ethyl-2-piperidinoacetyl-pyrrole—B.P.=110–120° C./0.5 mm. Hg
1-ethyl-2-piperidinoacetyl-pyrrole oxalate—M.P.=209–210° C.
1-ethyl-2-diethylaminoacetyl-pyrrole—B.P.=84–87° C./0.5 mm. Hg
1-ethyl-2-diethylaminoacetyl-pyrrole oxalate—B.P.=137–138° C.
1-(4'-bromo)-benzyl-2-pyrrolidinoacetyl-pyrrole oxalate—M.P.=142–143° C.
1-(4'-methoxy)-benzyl-2-piperidinoacetyl-pyrrole—B.P.=160–170° C./0.2 mm. Hg
1-(4'-methoxy)-benzyl-2-piperidinoacetyl-pyrrole hydrochloride—M.P.=173–175° C. (dec.)
1-(4'-bromo)-benzyl-2-piperidinoacetyl-pyrrole—B.P.=170–175° C./0.4 mm. Hg
1-(4'-bromo)-benzyl-2-piperidinoacetyl-pyrrole picrate—M.P.=145–147° C.
1-(4'-bromo)-benzyl-2-diethylaminoacetyl-pyrrole—B.P.=140–150° C./0.4 mm. Hg
1-(4'-bromo)-benzyl-2-diethylaminoacetyl-pyrrole picrate—M.P.=140–141° C.
1-(2,6'-dimethyl)-phenyl-2-piperidinoacetyl-pyrrole—B.P.=160–170° C./0.7 mm. Hg
1-(2',6'-dimethyl)-phenyl-2-piperidinoacetyl—M.P.=152–153° C. (dec.)
1-(2',6-dimethyl)-phenyl-2-pyrrolidinoacetyl-pyrrole—B.P.=140–150° C./0.4 mm. Hg
1-(2',6'-dimethyl)-phenyl-2-pyrrolidinoacetyl-pyrrole oxalate—M.P.=160–161° C.
1-(2',6'-dimethyl)-phenyl-2-diethylamino-pyrrole—B.P.=120–130° C./0.2 mm. Hg
1-(2',6'-dimethyl)-phenyl-2-diethylamino-acetyl-pyrrole picrate—M.P.=130–132° C.

EXAMPLE III 8 g. (0.025 mol) of 1-benzyl-2-(N-acetyl-N-benzyl-aminoacetyl)-pyrrole, 1 g. of 5% palladium on carbon and 40 ml. of absolute ethanol are placed in a 100 ml.

bottle of an atmospheric pressure hydrogenation apparatus. When the theoretical amount of hydrogen has been taken up the absorption ceases. The catalyst is removed from the reaction mixture by filtration, the solution is diluted with anhydrous diethyl ether and a solution of hydrogen chloride in diethyl ether is added. The product which precipitates after standing in a refrigerator is collected by filtration and dried in vacuo. Yield, 5.5 g. of 1-benzyl-2-methylaminoacetyl-pyrrole which after crystallization from ethyl alcohol melts at 194–197° C. (dec.).

By analogous procedures the following compounds have been prepared:

1-benzyl-2-ethylaminoacetyl-pyrrole hydrochloride—
  M.P.=198–202° C. (dec.)
1-benzyl-2-propylaminoacetyl-pyrrole hydrochloride—
  M.P.=169–173° C. (dec.)
1-benzyl-2-butylaminoacetyl-pyrrole hydrochloride—
  M.P.=155–158° C. (dec.)
1-benzyl-2-isobutylaminoacetyl-pyrrole hydrochloride
  M.P.=161–162° C. (dec.)
1-benzyl-2-sec.-butylaminoacetyl-pyrrole hydrochloride—
  M.P.=150–152° C. (dec.)
1-(2'-chloro)-benzyl-2-isopropylaminoacetyl-pyrrole
  oxalate—M.P.=185–187° C. (dec.)

EXAMPLE IV

To a solution of 2 g. (0.0086 mol) of 1-benzyl-2-dimethylaminoacetyl-pyrrole in 5 ml. of acetone is added 10.4 g. (0.0731 mol) of methyl iodide. During this addition the solution is maintained at room temperature. After standing all night in a refrigerator, the precipitate is collected by filtration, washed with acetone and dried in vacuo. Yield 2.8 g. of 1-benzyl-2-dimethylaminoacetyl-pyrrole methyl iodide; M.P.=176–177° C. (from water).

In the same way the following compounds have been prepared:

1-benzyl-2-diethylaminoacetyl-pyrrole methyl iodide—
  M.P.=165–167° C. (dec.)
1-benzyl-2-dipropylaminoacetyl-pyrrole methyl iodide—
  M.P.=152–154° C.
1-benzyl-2-diisopropylaminoacetyl-pyrrole methyl
  iodide—M.P.=151–153° C. (from abs. ethyl alcohol)
1-benzyl-2-dibutylaminoacetyl-pyrrole methyl iodide—
  M.P.=168–170° C. (from ligroin)
1-benzyl-2-pyrrolidinoacetyl-pyrrole methyl bromide—
  M.P.=138–140° C. (from water)
1-benzyl-2-piperidinoacetyl-pyrrole methyl iodide—
  M.P.=161–162° C. (from abs. ethyl alcohol)
1-benzyl-2-morpholinoacetyl-pyrrole methyl iodide—
  M.P.=171–173° C. (from abs. ethyl alcohol)

We claim:
1. A compound of the formula

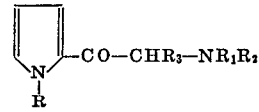

wherein R is a member selected from the group consisting of methyl, ethyl, phenyl or benzyl whose benzene moiety may be further substituted with one or two substituents selected from the group consisting of halogen, methyl and methoxy; $R_3$ is hydrogen or methyl; $R_1$ is selected from the group consisting of alkyl having from 1 to 4 C atoms; $R_2$ is selected from the group consisting of alkyl having from 1 to 4 C atoms benzyl or taken together with $R_1$ and the nitrogen atom to which they are attached, is a heterocyclic ring selected from the group consisting of piperidine, morpholine and pyrrolidine, and its pharmaceutically suitable salts of addition with acids and alkyl halides.

2. A compound according to claim 1 in which R is phenyl or benzyl whose benzene moiety may be further substituted by one or two substituents selected from the group consisting of halogen, methyl and methoxy.

3. 1-(4'-chloro)-benzyl-2-pyrrolidinoacetyl pyrrole.
4. 1-benzyl-2-pyrrolidino acetyl pyrrole.
5. 1-benzyl-2-piperidino acetyl pyrrole.
6. 1-benzyl-2-pyrrolidino acetyl pyrrole methyl bromide.

References Cited

UNITED STATES PATENTS

| | | | |
|---|---|---|---|
| 2,655,512 | 10/1953 | Dunlop et al. | 260—326.5 |
| 3,410,857 | 11/1968 | Schoen et al. | 260—294.7 |
| 3,458,515 | 7/1969 | Archibald et al. | 260—268 |
| 3,539,589 | 11/1970 | Teotino et al. | 260—326.5 |

OTHER REFERENCES

Oddo et al., Chem. Abstracts 6:3425.

HENRY R. JILES, Primary Examiner

G. T. TODD, Assistant Examiner

U.S. Cl. X.R.

260—247.5 R, 326.5 G, 326.5 J; 424—248, 267, 274